US006778236B1

(12) United States Patent
Crawford et al.

(10) Patent No.: US 6,778,236 B1
(45) Date of Patent: Aug. 17, 2004

(54) REFLECTIVE LIQUID CRYSTAL STRAIN GAUGE WITH ASPECTED PARTICLES AND POLARIZATION-SENSITIVE DEVICES

(75) Inventors: Gregory P. Crawford, Providence, RI (US); Darran R. Cairns, Providence, RI (US); Christopher C. Bowley, Woodbury, MN (US); Sorasak Danworaphong, Providence, RI (US); Adam K. Fontecchio, Medfield, MA (US); Sadeg M. Faris, Pleasantville, NY (US); Le Li, Yorktown Heights, NY (US)

(73) Assignees: Reveo, Inc., Elmsford, NY (US); Brown University Research Foundation, Providence, RI (US)

(*) Notice: Subject to any disclaimer, the term of this patent is extended or adjusted under 35 U.S.C. 154(b) by 118 days.

(21) Appl. No.: 09/584,875

(22) Filed: Jun. 1, 2000

(51) Int. Cl.[7] .............................................. G02F 1/1333
(52) U.S. Cl. ........................................... 349/86; 33/501
(58) Field of Search ............................ 349/96, 199, 201

(56) References Cited

U.S. PATENT DOCUMENTS

| 3,872,050 | A |   | 3/1975  | Benton et al. ............... 260/37    |
| 4,123,158 | A |   | 10/1978 | Reytblatt ..................... 356/32   |
| 4,734,577 | A |   | 3/1988  | Szuchy ........................ 250/227  |
| 5,096,282 | A | * | 3/1992  | Margerum et al. ............. 359/3      |
| 5,132,529 | A |   | 7/1992  | Weiss ..................... 250/227.16   |
| 5,270,781 | A |   | 12/1993 | Singh et al. .................. 356/32   |
| 5,438,879 | A |   | 8/1995  | Reda ............................ 73/800  |
| 5,564,832 | A | * | 10/1996 | Ball et al. .................... 374/161 |
| 5,682,236 | A | * | 10/1997 | Trolinger et al. ............ 356/345   |
| 5,723,794 | A | * | 3/1998  | Discenzo ..................... 73/800    |
| 5,734,108 | A | * | 3/1998  | Walker et al. ................. 73/650   |
| 5,748,272 | A |   | 5/1998  | Tanaka et al. ................. 359/86   |
| 5,751,452 | A |   | 5/1998  | Tanaka et al. ................. 359/52   |
| 5,812,229 | A |   | 9/1998  | Chen et al. .................. 349/113   |
| 5,875,012 | A |   | 2/1999  | Crawford et al. .............. 349/74    |
| 5,988,000 | A |   | 11/1999 | Adams ................... 73/862.044     |
| 6,278,506 | B1| * | 8/2001  | Sumiyoshi et al. ........... 349/86      |

OTHER PUBLICATIONS

"Optical Strain Characteristics of Holographically Formed Polymer–Dispersed Liquid Crystal Films", Cairns et al., *Applied Physics Letters*, vol. 77, No. 77, pp. 2677–2679, Oct. 23, 2000.

Berthold et al., "Design and Characterization of a High Temperature Fiber–Optic Pressure Transducer" *Journal of Lightwave Technology* LT–5:870–876 (Jul. 1987).

(List continued on next page.)

*Primary Examiner*—Tarifur R. Chowdhury
*Assistant Examiner*—Timothy L Rude
(74) *Attorney, Agent, or Firm*—Mary Rose Scozzafava; Ralph J. Crispino

(57) ABSTRACT

A reflective strain gauge includes an holographically-formed polymer dispersed liquid crystal (H-PDLC) film comprising layers of liquid crystal (LC) droplets in a matrix polymer, the H-PDLC film having a reflection or transmission grating capable of reflecting or transmitting light of a selected wavelength, and means for adhering the film to a surface of a workpiece for monitoring the strain at said surface. A change in the nature of the reflected light is an indication of strain. Also included is a polarizing material having an holographically-formed polymer dispersed liquid crystal (H-PDLC) film comprising layers of liquid crystal (LC) droplets in a matrix polymer, the H-PDLC film having a reflection grating capable of reflecting light of a selected wavelength, wherein the reflection grating of the H-PDLC film is oriented, such that the refractive index parallel to said axis of orientation ($n_e$) is greater than the refractive index perpendicular to said axis ($n_o$).

17 Claims, 11 Drawing Sheets

OTHER PUBLICATIONS

Bock et al., "Fiber–Optic Strain–Gauge Manometer up to 100 MPA" *IEEE Transactions on Instrumentation and Measurement* 41:72–76 (Feb. 1992).

Bock et al., "GaAs–Based Fiber–Optic Pressure Sensor" *IEEE Transactions on Instrumentation and Measurement* 41:68–71 (Feb. 1992).

Iwamoto et al., "Pressure Sensor Using Optical Fibers" *Applied Optics* 29:375–378 (Jan. 1990).

Froggatt et al., "Distributed Measurement of Static Strain in an Optical Fiber with Multiple Bragg Gratings at Nominally Equal Wavelengths" *Applied Optics* 37:1741–1746 (Apr. 1998).

Froggatt et al., "High–Spatial–Resolution Distributed Strain Measurement in Optical Fiber with Rayleigh Scatter" *Applied Optics* 37:1735–1740 (Apr. 1998).

Singh et al., "Simultaneously Measuring Temperature and Strain Using Optical Fiber Microcavities" *Journal of Lightwave Technology* 15:647–653 (Apr. 1997).

Tanaka et al., "Holographically Formed Liquid–Crystal/Polymer Device for Reflective Color Display" *Journal of the SID* 2/1:37–40 (1994).

Tanaka et al. "Optimization of Holographic PDLC for Reflective Color Display Applications" *SID 95 Digest* 18.1:267–270 (1995).

Weiss, "Fiber–Optic Strain Gauge" *Journal of Lightwave Technology* 7:1308–1318 (Sep., 1989).

Bowley et al., "Diffusion Kinetics of Formation of Holographic Polymer–Dispersed Liquid Crystal Display Materials", *Applied Physics Letters*. 76:2235 (Apr. 17, 2000).

Crawford et al., "Reflective Color LCDs Based on H–PDLC and PSCT Technologies," *SID 96 Digest ; 99–102* (1986).

Bowley et al., "Electro–Optic Investigations of H–PDLCs: The Effect of Monomer Functionality of Display Performance", *SID, '99 Digest of Technical Papers*, pp. 958–961, (May, 1999).

Bowley et al., "Advances in Holographic Polymer Dispersed Liquid Crystal Technology", *Material Research Society*, vol. 559, (May 1999).

Bunning et al., "The Morphology and Performance of Holographic Transmission Gratings Recorded in Polymer Dispersed Liquid Crystals", *Polymer*, vol. 36 No. 14 pp. 2699–2708 (1995).

Date et al., "Three Primary–Color Holographic Polymer Dispersed Liquid Crystal (HPDLC) Device for Reflective Displays".

Fontecchio et al., "Improvement in Holographically–Formed Polymer Dispersed Liquid Crystal Performance Through Acrylated Monomer Functionality Studies" *SPIE*, vol. 3008, pp. 36–44, (Jul., 1999).

Kato, et al., "Reflective Liquid Crystal Color Display Technologies", *Electronic and Communications in Japan, Part 2*, vol. 81, pp. 127–134, (Mar., 1998).

Sutherland, et al. "Bragg Gratings in an Acrylate Polymer Consisting of Periodic Polymer–Dispersed Liquid–Crystal Planes" *Chem. Mater.*, 5, pp. 1533–1538 (1993).

Tanaka, et al., "A Liquid–Crystal/Polymer Optical Device Formed by Holography for Reflective Color Display Applications", *SID International Symposium Digest of Technical Papers*, vol. 24, pp. 109–111 (1993).

Tanaka, et al., "Fabrication of Holographic Polymer Dispersed Liquid Crystal (HPDLC) with High Reflection Efficiency", *Jpn. J. Appl. Phys*. vol. 38 pp. L277–L278 (1999).

* cited by examiner

REFLECTIVE LIQUID CRYSTAL STRAIN GAUGE WITH ASPECTED PARTICLES AND POLARIZATION-SENSITIVE DEVICES

BACKGROUND OF THE INVENTION

This invention relates to non-destructive methods and apparatus for evaluating strain on a workpiece surface. The invention further relates to polarization-dependent reflective devices.

It is often desirable not only to measure the magnitude of an applied strain, but to know the tensor and even the precise location of the strain in the workpiece. Prior art strain gauges have been unable to provide this information in a simple and low-cost manner.

One type of fiber-optic strain gauge relies upon an optical fiber which transmits light along its length with little or no loss when straight. When deformed under an applied stress, i.e., by bending, significant attenuation of the light signal occurs. The extent of light transmission loss may be correlated to the deformation strain. J. D. Weiss in "Fiber-Optic Strain Gauge" (*J. Lightwave Tech.* 7(9), September 1989) used the same principle to design an fiber-optic strain gauge using optical fibers having permanent microbends which demonstrate an increase in light transmission under applied tension. Fiber-optic strain gauges are able to identify the existence of strain, but are unable to identify its location within the article since bending (or extension of the microbend) is propagated along the entire length of the optical fiber and is not restricted to the strain site.

Fiber-optic Bragg gratings have also been described for measuring strain. Bragg gratings on an optical fiber are produced by UV exposure causing periodic changes in the index of refraction of the fiber core. A typical Bragg grating strain sensing system involves Bragg wavelength shift detection. Such sensing systems have very low reflectivity, making the sensitivity of the measurements low. Furthermore, the fragility of the optical fibers gives rise to the need to embed the fibers in a matrix so that only bulk strain is practically measured using this technique.

Photolithography has been used to form diffraction gratings in metallic strips. Applied stress causes the grating dimensions to shift which can be monitored to detect strain. The preparation and use of photolithographic diffraction gratings is awkward and computationally complex. Furthermore, the diffraction grating can not provide information regarding the location of strain in a workpiece.

Strain gauges have been described which rely upon the optical properties of thin films to detect and even quantify strain. U.S. Pat. No. 4,123,158 reports on the use of optical properties such as birefringence to detect surface strain. Photoelastic materials are used which have the optical property of polarizing light when under stress and then transmitting such light on the principle stress planes with velocities depending upon the magnitude of the applied stress. When such gauges are subjected to monochromatic polarized light, the birefringence of the photoelastic material causes the light to emerge refracted in two orthogonal planes. Because the refractive indices of light propagation are different in each direction, a phase shifting of the light waves occurs. When the waves are combined with polarizing film, regions of stress where the wave phase is canceled appear black and regions of stress where the wave phase is combined appear white. When white light is used in place of monochromatic light, the relative retardation of the photoelastic material causes the fringes to appear in colors of the spectrum.

Reflective liquid crystal displays have been developed which rely on polymer dispersed liquid crystals (PDLCs). A conventional PDLC is formed by phase separation of a liquid crystal phase from a matrix polymer phase. Photopolymerization-induced phase separation utilizes a mixture of a low molecular weight liquid crystal and a photocurable monomer. Irradiation of the homogeneous pre-polymer mixture initiates polymerization, which in turn induces a phase separation between the polymer and liquid crystal (LC). Liquid crystal droplets are formed within the sample to modulate the LC droplet density on the order of the wavelength of light.

H-PDLCs are phase separated compositions formed under holographic conditions. Holographic or optical interference preparative techniques have been used to carry out polymerization to selectively position regions of liquid crystal and polymer. Instead of random arrangement of LC droplets, the holographic exposure induces a periodic array of LC droplets and matrix polymer planes. On exposure to an optical interference pattern, typically formed by two coherent, counter-propagating lasers, polymerization is initiated in the light fringes. A monomer diffusion gradient is established as the monomer is depleted in the dark fringes, causing migration of liquid crystal from the dark fringes. The result is LC-rich areas where the dark fringes were located and essentially pure polymer regions where the light fringes were located.

Thin H-PDLC films have been incorporated into displays relying upon the optical reflective properties of the material to provide visual images. Displays incorporating these materials have been reported in "Holographically formed liquid crystal/polymer device for reflective color displays" by Tanaka et al. in *Journal of the Society for Informational Display* (*SID*), Volume 2, No. 1, 1994, pages 37–40; and also in "Optimization of Holographic PDLC of Reflective Color Display Applications" in *SID '95 Digest*, pages 267–270 (1995). The reflective properties of such films have not been exploited in the field of strain determination.

SUMMARY OF THE INVENTION

It is an object of the invention to provide an improved strain gauge capable of providing information regarding the existence, location and/or magnitude of strain in a workpiece.

It is a further object of the invention to provide a non-destructive strain gauge.

It is a further object of the invention to provide holographically-formed polymer dispersed liquid crystals (H-PDLCs) based devices for use in observation and measurement of strain.

It is a further object of the invention to provide polarization-sensitive reflective devices useful as strain gauges, displays or polarizing filters, and the like.

In one aspect of the invention, a reflective strain gauge includes an holographically-formed polymer dispersed liquid crystal (H-PDLC) film comprising layers of liquid crystal (LC) droplets in a polymer matrix, in which the H-PDLC film has a reflection or transmission grating capable of reflecting or transmitting light of a selected wavelength, and means for securing the film to a surface of a workpiece for monitoring the strain at said surface. Strain is observed by a change in the nature of the light reflected or transmitted from the surface of an H-PDLC-containing film.

In preferred embodiments, the film includes multiple gratings, wherein different gratings are responsive to stress applied in different directions. The multiple gratings are located within a single H-PDLC layer, or in a plurality of H-PDLC layers in which each layer has at least one grating. The grating is oriented within the H-PDLC film so that surface strain is observed as a blue shift or a red shift of the reflected light. In other embodiments, the intensity of the reflected light is polarization dependent. The LC layers may be substantially parallel, substantially perpendicular, or at an angle to the film surface.

In another preferred embodiment, the LC droplets of the H-PDLC film are oriented such that the refractive index parallel to the axis ($n_e$) is greater than the refractive index perpendicular to the axis ($n_o$). $n_o$ substantially matches the refractive index of the matrix polymer, so that light polarized perpendicular to the axis is transmitted, and light polarized parallel to the axis is reflected. Orientation may arise in the strained state such that such that in the LC droplets form ellipsoids with long axes aligned parallel to an axis of an applied force. Orientation may arise by H-PDLC formation under an orienting force.

In other embodiments, the matrix polymer is selected to have sufficient elasticity to sustain an applied strain without failure. The strain is proportionate to a strain of a workpiece.

In another embodiment of the invention, the film includes aspected particles embedded in an elastic polymer, and the aspected particles contain an H-PDLC material comprising layer of LC droplets in a matrix polymer. The aspected particles have an aspect ratio in the range of at least 4:1, and preferably are in the range of at least 10:1.

In another aspect of the invention, a method for detecting strain in an article is provided. The method includes attaching a reflective strain gauge to a surface of an article, the strain gauge comprising an holographically-formed polymer dispersed liquid crystal (H-PDLC) film having layers of liquid crystal (LC) droplets in a matrix polymer and having a reflection or transmission grating capable of reflecting or transmitting light of a selected wavelength, illuminating the film with light, and monitoring for a change in the reflected or transmitted light, which is associated with strain in the article.

In some embodiments, the change in the reflected light comprises a change in the wavelength of the reflected light, and the wavelength shift may be in the range of 5–100 nm, or is in the range of 5–50 nm, or in the range of about 10–25 nm.

In other embodiments, the change in the reflected light comprises a change in the intensity of the reflected light.

In other embodiments, the strain is the result of a compressive force, or of a tensile force, or of a torsional or shearing force. The film may be positioned such that when a tensile force is applied, the spacing between the layers contracts. The tensile force may be applied along the long axis of the LC droplet layers, and the shift may be a blue shift of the reflected or transmitted light. The film may be positioned such that when a tensile force is applied, the spacing between the layers expands. The tensile force is applied along a direction transverse to the long axis of the LC droplets layers, and the shift is a red shift of the reflected light.

In other embodiments, the method includes the step of illuminating the film with polarized light. In the strained state the LC droplets form ellipsoids with long axes aligned parallel to an axis of an applied force, such that the refractive index parallel to the axis ($n_e$) is greater than the refractive index perpendicular to the axis ($n_o$). $n_o$ substantially matches the refractive index of the polymer, so that light polarized perpendicular to the axis is transmitted, and light polarized parallel to the axis is reflected.

In other embodiments, the matrix polymer is selected to have sufficient elasticity to sustain strain without failure, the strain being proportional to the strain of the article. The film includes multiple reflection gratings, wherein different gratings are responsive to stress applied in different directions. The multiple gratings are located within a single H-PDLC layer, or in a plurality of H-PDLC layers and each layer includes at least one grating. The LC layers may be substantially parallel, substantially perpendicular, or at an angle to the article surface.

In other embodiments, the method includes the step of monitoring the wavelength shift by a technique selected from the group consisting of visual observation, photodiode observation and spectrophotometry. The applied strain may be in the range of up to about 21%, or greater dependent upon the materials selected for the H-PDLC matrix polymer.

In another embodiment of the invention, the film includes aspected particles embedded in an elastic polymer, and the aspected particles include an H-PDLC material comprising layer of LC droplets in a matrix polymer. The aspected particles orient along a direction of an applied force when the film is stressed.

In another aspect of the invention, a polarization-sensitive reflective display is provided having an holographically-formed polymer dispersed liquid crystal (H-PDLC) film comprising layers of liquid crystal (LC) droplets in a matrix polymer, the H-PDLC film having a reflection grating capable of reflecting light of a selected wavelength, wherein the reflection grating of the H-PDLC film is oriented, such that the refractive index parallel to the axis of orientation ($\eta_e$) is greater than the refractive index perpendicular to the axis ($\eta_o$) In some embodiments, the display has $n_o$ substantially matches the refractive index of the matrix polymer, so that light polarized perpendicular to the axis is transmitted, and light polarized parallel to the axis is reflected.

In some embodiments of the display, orientation is attained by application of a strain, such that in the strained state the LC droplets form ellipsoids with long axes aligned parallel to the axis of the applied strain. In other embodiments, orientation is achieved by H-PDLC formation under an orienting force. The display may further include an oriented or polar molecule to promote orientation of the LC droplets. The polar or orienting molecule may be and azo dye, and the azo dye is selected from the group consisting of Congo red, azobenzene, methyl orange, methylenene blue and crystal violet.

In another aspect of the invention, a polarizing light filter is provided having an holographically-formed polymer dispersed liquid crystal (H-PDLC) film comprising layers of liquid crystal (LC) droplets in a matrix polymer, the H-PDLC film having a reflection grating capable of reflecting light of a selected wavelength, wherein the reflection grating of the H-PDLC film is oriented, such that the refractive index parallel to the axis of orientation ($n_e$) is greater than the refractive index perpendicular to the axis ($n_o$).

In yet another aspect of the invention, a method of preparing an holographic polymer dispersed liquid crystal (H-PDLC) film having bipolar oriented LC droplets is provided. A film comprised of a mixture of liquid crystal, a polar molecule and a photo-polymerizable monomer is illuminated with light of an energy sufficient to orient the polar molecule but insufficient to initiate polymerization of the photo-polymerizable monomer. The film is then illuminated with at least one holographic light pattern to obtain an holographically-formed polymer dispersed liquid crystal (H-PDLC) film comprising layers of liquid crystal (LC) droplets in a matrix polymer wherein the LC droplets contain bipolar LC molecules.

By "securing means" as that term is used herein is meant any clamp, fastener, support, glue, adhesive, cement, seal or paste, and the like which may be used to secure the strain gauge and the surface. The securing means may be a mechanical means, such as a clamp, clip or other suitable fastener. The mechanical securing means desirably secures the strain gauge to the surface in a manner which permits transmission of the strain experienced by the surface to the strain gauge. Exemplary means include bands or other clamps over an area or region of the H-PDLC (as compared to a point contact). The securing means also includes adhesives, such as glues and cements, that form a bond between the strain gauge and the surface. The bond can be established between the entire strain gauge or only a portion of the strain gauge. The bond transmits strain from the surface to the strain gauge.

By "strain," as that term is used herein is meant a deformation in a material resulting from an applied force or stress. In the strain gauge, that force is transmitted to it from the workpiece. In the workpiece that force is a tensile, compressive, torsional, or shearing force or the like, for which observation or detection by the gauge is desired.

By "reflection grating," as that term is used herein is meant a periodic array of LC droplet planes having an orientation and layer spacing sufficient to reflect light of a selected wavelength that is incident on the surface of the grating.

By "transmission grating," as that term is used herein is meant a periodic array of LC droplet planes having an orientation and layer spacing sufficient to diffract light and to transmit light of a selected wavelength.

The H-PDLC strain gauge of the invention has the advantage over mechanical or electrical transducer strain gauges in that it is not disturbed by electromagnetic interference. This is particularly desirable for making measurements in electromagnetically noisy environments where strong electrical and/or magnetic fields may be present. A further advantage of the strain gauge is its ability to provide information regarding the location and directionality of applied stress. The strain gauge may be used to detect material failures, or to monitor deformation over time to preempt failure. A preferred embodiment uses the strain gauge to detect weld deformation.

BRIEF DESCRIPTION OF THE DRAWING

The invention is described with reference to the following figures which are presented for the purpose of illustration only and are not intended to be limiting of the invention, and in which:

FIG. 5 is a plot of $d\lambda/\lambda$ vs. dL/L and stress vs. dL/L for a reflective H-PDLC film;

DETAILED DESCRIPTION OF THE INVENTION

Figure 2:
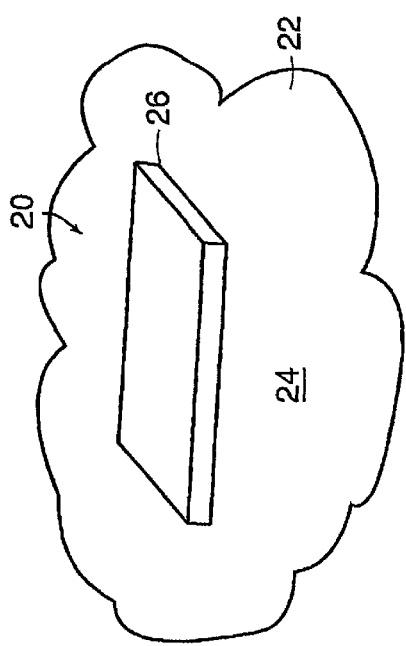
FIG. 2 depicts a reflective strain gauge which includes the features of the invention.

FIG. 2 is an illustration of a reflective strain gauge 20 which incorporates the features of the invention for displaying visual patterns representative of strain in a workpiece 22. The strain gauge 20 is bonded to a surface 24 of the workpiece 22 using an adhesive 26 or any other suitable bonding means. The strain gauge includes an H-PDLC film (FIG. 3) which incorporates a reflection grating capable of reflecting light of a selected wavelength. The strain experienced by the workpiece 22 is transmitted to the gauge 20 which alters the reflective light properties of the gauge. The change in the reflective light properties of the film is representative of, and proportional to, the strain experienced by the workpiece 22. The change in the light reflective properties may be in the intensity of the reflected light, e.g., an "on-off" modality, or it may be in the wavelength of the reflected light, e.g., a wavelength shift. The change in the reflected light may be observed visually in those cases where the shift is dramatic enough to be observed by the human eye. Alternatively, the strain in the workpiece may be observed instrumentally by monitoring the intensity of the reflected light using a photodiode, observing a wavelength shift using a spectrometer or other suitable instrument, or by observing a polarization-dependent shift in the reflected light by incorporating an analyzer between the H-PDLC film and the detector. Application of these techniques is understood by those of ordinary skill in the art.

Figure 1A:
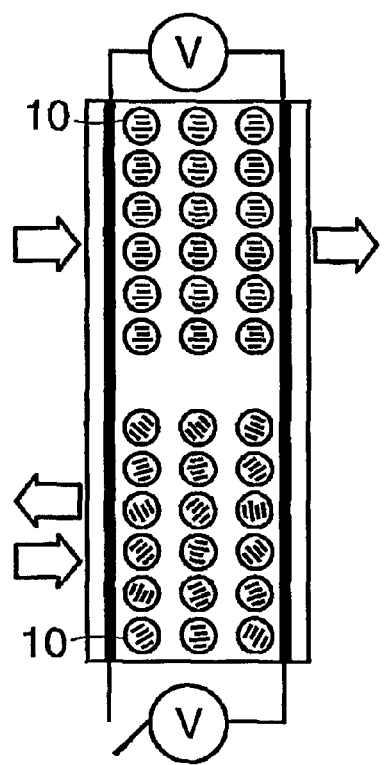
FIGS. 1A–B are schematic views illustrating (1A) a reflective H-PDLC; and (1B) a transmission H-PDLC.
Figure 1B:
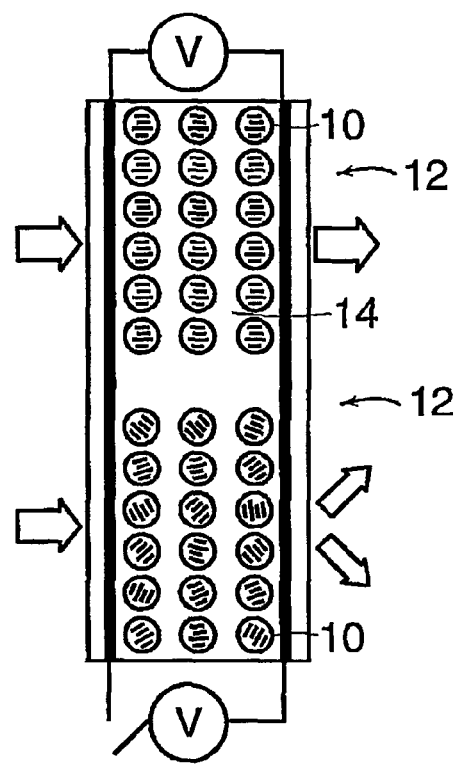

H-PDLCs are phase separated compositions formed under holographic conditions. Instead of random arrangement of LC droplets, holographic exposure induces a periodic array of LC droplets and matrix polymer planes, as shown in FIGS. 1A and 1B. Upon illumination with holographic light, the monomer diffuses to high light intensity regions where it polymerizes. The liquid crystal remains in the dark regions and phase separates into small droplets 10 on the order of nanometers, e.g., 10–200 nm, in ordered, stratified layers 12. The actual phase-separated morphology varies dependent upon the particular liquid crystal and the relative composition of the liquid crystal and matrix polymer 14 used. For lower liquid crystal concentrations, spherical or ellipsoidal LC droplets are localized in stratified layers and are completely surrounded by matrix polymer 14. At higher liquid crystal concentrations, connectivity between the LC droplets may be observed. Morphology of the resultant composition also depends on the polymer (composition, molecular weight, etc.), for example, higher molecular weight polymers tend to favor phase-separation.

If the refractive index of the LC droplet 12 planes ($n_{LC}$) is different from that of the polymer 14 planes ($n_p$), light of a specific wavelength is reflected by the periodic modulation in the refractive index, which is illustrated in the lower portion of FIG. 1A. If $n_{LC}$ is equal to $n_p$, the periodic refractive index modulation disappears and the incident light is transmitted, as is illustrated in the upper portion of FIG. 1A. The resulting optical interference pattern reflects at the Bragg wavelength, $\lambda = 2nd \sin \theta$, where n is the index of refraction, $\theta$ is the angle between the substrate and viewing direction, and d is the spacing between the LC layers. The interference pattern can be selected to form Bragg gratings which can reflect any visible light. The reflection intensity is determined by the effective refractive index of the LC droplet planes. The Bragg reflection occurs in either the reflection mode (FIG. 1A) or diffraction mode (FIG. 1B) depending on the orientation of the Bragg grating. This, in turn, is dependent upon the beam geometry during phase separation.

It is understood that in all instances where reference is made to reflection gratings, a transmission grating may be used. In those instances it is desirable that the workpiece be translucent so that changes in the transmitted light are observable.

The adhesive may be any material which forms a surface conforming bond between two substrates. The adhesive desirably transfers strain from the workpiece to the gauge (H-PDLC film) to thereby deform the gauge with the resultant change in reflected light. The adhesive should be sufficiently compliant so that it does not interfere with the transmission of strain from the article surface to the strain gauge. The desired materials properties for the adhesive include a low elastic modulus, a high yield strength, high adhesion, and a high coefficient of friction, i.e., the interfaces between the adhesive and workpiece and between the adhesive and H-PDLC film do not slip. The adhesive also may be relatively temperature-insensitive, that is, the adhesive may possess a low thermal expansion co-efficient and may be largely unaffected by water (moisture-insensitive) for those applications where the gauge is to be used outdoors, in moist environments, and/or in temperature extremes.

Figure 3:
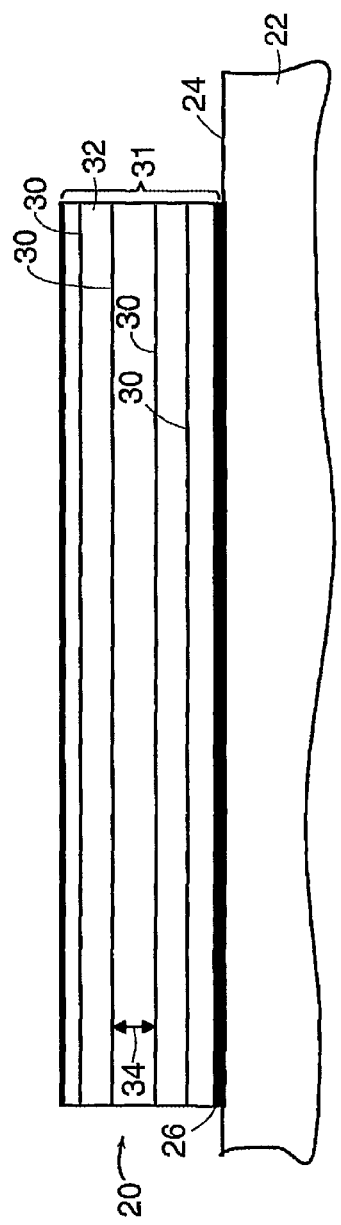
FIG. 3 is a cross-sectional illustration of the sensor element of the reflective strain gauge of FIG. 2.

Turning now to FIGS. 3 and 4, the structure and operation of the reflective strain gauge is described. The gauge 20 is attached to the surface 24 of workpiece 22, for example, through adhesive layer 26. The gauge is made up of an H-PDLC film 31 having liquid crystal (LC) layers 30 in a matrix polymer 32. The stratified arrangement of LC layers in matrix polymer gives rise to a reflection grating which reflects a particular wavelength of light. The exact wavelength is determined by the size of the spacing between the layers, indicated by arrow 34. The liquid crystal layers are shown in FIG. 3 at an orientation substantially parallel to the workpiece surface, however, the layers may have any desired orientation and may be located, for example, perpendicular to or at any other intermediate angle with respect to the workpiece surface. The H-PDLC film may be any conventional film capable of reflection of a selected wavelength of light. It should be understood that the number of LC layers is shown schematically and any number of layers may be used in the gauge. For the purposes of simplicity, only a few layers are shown.

Figure 4A:
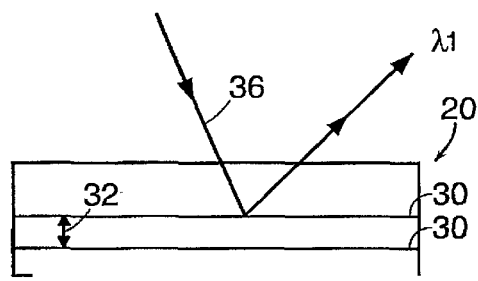
FIGS. 4–5 are cross-sectional illustrations of a reflective strain gauge of the invention (A) in the unstrained state, (B) under tensile strain, and (C) under compressive strain.

The shift in wavelength with strain is a function of the extent of d-spacing contraction or expansion of the LC layers. For a tensile stress applied along the length of the H-PDLC film and the LC layers as are shown in FIG. 4A, the d-space contraction may be quantified to a first approximation by $dL/L = -vdW/W$, where L is the sample length in the direction of pulling, W is the width of the sample perpendicular to pulling, and v is Poisson's ratio. Poisson's ratio may have a value between −1 and +0.5. Typical values for polymeric materials lie in the range of 0.3–0.5. Since the peak reflected wavelength of an H-PDLC film is related to the spacing between LC planes, the percent change in film thickness of the sample is equal to the percent change in wavelength. Thus, $dL/L = -vd\lambda/\lambda$.

Figure 4B:
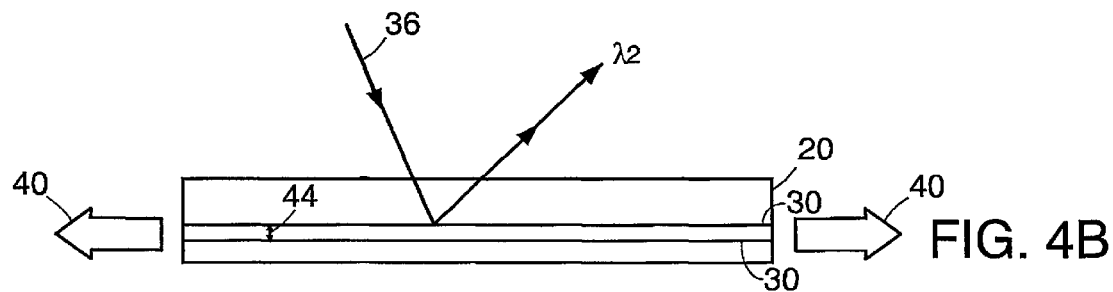
Figure 4C:
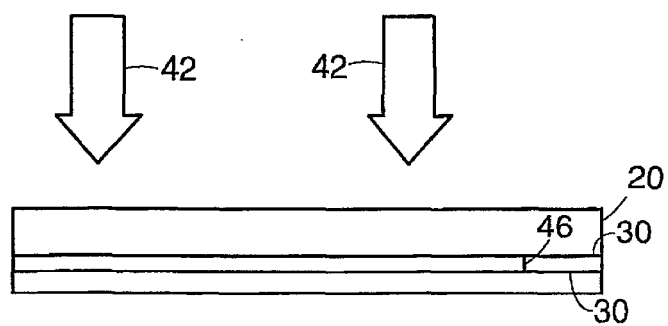

FIG. 4 illustrates the basis for the observed wavelength shift in the H-PDLC films used in the strain gauges of the invention. In the unstrained state (FIG. 4A), the liquid crystal layers have a spacing "d" indicated by arrow 32. Light 36 incident on the gauge is reflected at a wavelength $\lambda_1$ that is representative of the d-spacing of the LC layers based on the Bragg equation, $\lambda = 2nd \sin \theta$. When the workpiece (not shown) is strained, such as by application of a force indicated by large arrows 40 (as in FIG. 4B), the strain is transmitted through the article and into the gauge. Under tensile force 40 the H-PDLC film is stretched and the film thickness contracts, with a corresponding contraction of the LC layers. The gauge now has a new d-spacing indicated by small arrow 44. The new d-spacing gives rise to reflection of light of a different wavelength $\lambda_2$. With a contraction of the d-spacing, a shift of the reflected light towards the blue region in the visible spectrum (blue shift) is observed for the same viewing angle. A compressive force, indicated by large arrows 42, may also give rise to a new d-spacing indicated by arrows 46 and resulting in a blue shift in the reflected light, as is shown in FIG. 4C. Thus, H-PDLC films may also be used in pressure sensing devices.

Figure 5:
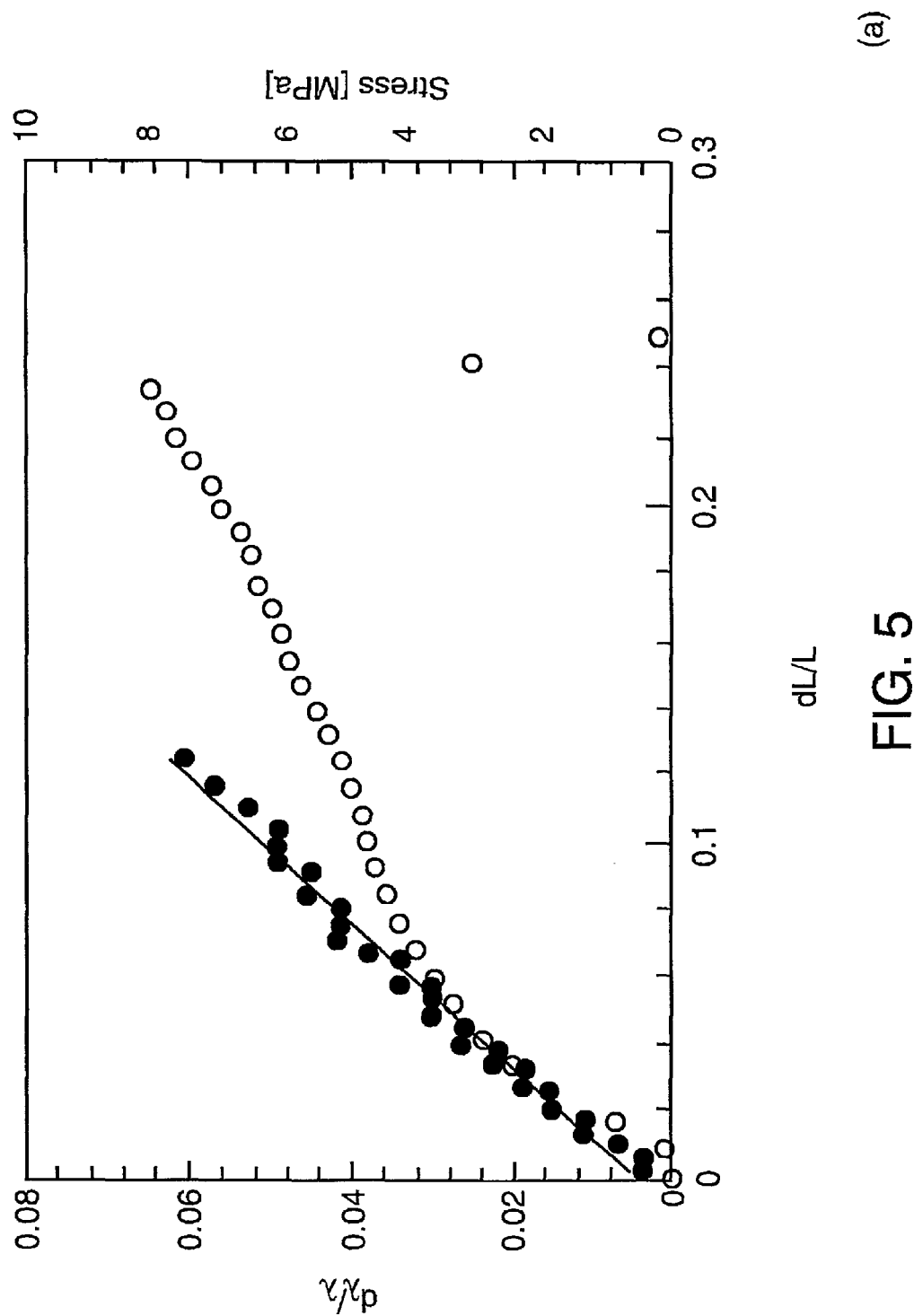

FIG. 5 shows the stress-strain curve (open symbols) and fractional wavelength shift-strain curve (closed symbols) for an H-PDLC film in uniaxial tension. The relationship between layer spacing and wavelength is demonstrated and the wavelength shift is clearly evident from the $d\lambda/\lambda$ vs. $dL/L$ (engineering strain) curve and changes linearly over the observed strain range (0–12%). A measurable and linear wavelength shift in response to an applied stress is clearly desirable in a strain gauge. The Poisson's ratio may be calculated from the slope of the curve and is 0.46 in this case (within the predicted range for conventional polymeric materials used in the sample). This is consistent with the shift in reflected wavelength being due primarily to the d-space contraction of the H-PDLC film.

FIG. 5 also shows the response of the H-PDLC film to stress. The yield stress is the stress at which the slope of the stress-strain curve changes, which is observed in the present example at about 3.9 mPa and strain of about 6%. The yielding of the polymer at 6% results in some permanent deformation (plastic strain) after unloading. The sudden drop at about 25% in the stress-strain curve indicates that the polymer has fractured. The sudden drop in the stress at about 25% extension in the polymer film indicates the tensile strength of the H-PDLC film (the point at which the film fails) and is the limit of operation for this particular film composition. The high strain to failure is a desirable feature of these materials, so that the gauge is capable of operating under a wide range of conditions. Suitable materials for high strain tolerance typically involve use of low crosslink density polymers, however, the strength of the film may be formulated to vary dramatically by modification of polymer composition and degree of crosslink.

Figure 6A:
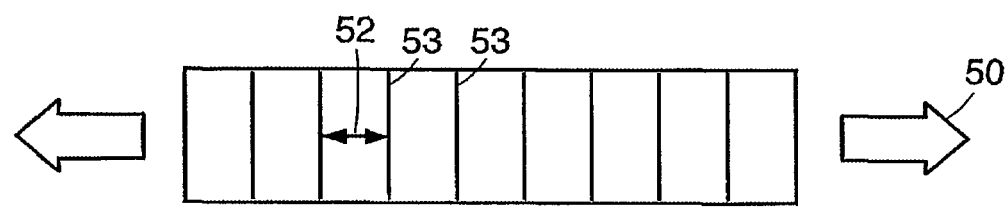
FIGS. 6A–B are cross-sectional illustrations of other reflective strain gauges of the invention having different orientations of the LC planes.
Figure 6B:
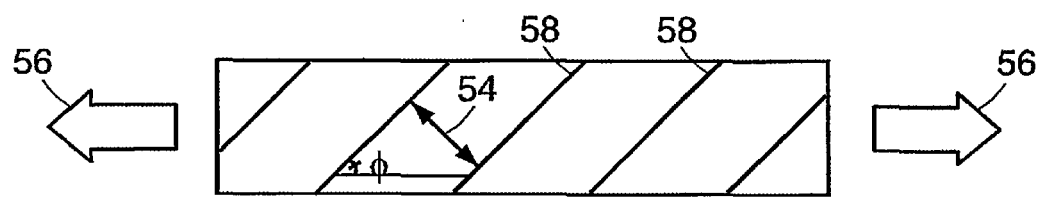

FIGS. 6A and 6B illustrate circumstances in which the LC layers may be expanded rather than contracted upon application of a force. In FIG. 6A, a tensile force 50 may give rise to an expansion of the d-spacing 52 between layers 53 resulting in a shift to higher wavelengths, i.e., a red shift. The device is set up in a transmission mode, due to the perpendicular orientation of the LC layers in FIG. 6A, however, the transmitted light would experience the same wavelength shift as described above for reflected light. As in the reflection mode, the wavelength shift is proportional to strain experienced in the workpiece.

FIG. 6B illustrates another embodiment of the invention in which the orientation of the LC layers is not in alignment with or orthogonal to the direction of the applied stress. A force 56 is applied at an angle θ with respect to the LC layers 58, where θ is the angle between the vectors of the applied force and the LC layer. The change in d-spacing 54 (and the resultant wavelength) is non-linear. The response of the layer to the applied force is complex because both a compressive and tensile component are present.

At low θ, deformation is due primarily to Poisson contraction and the fractional wavelength shift is approximately one-half the strain in the sample. At high θ, the fractional shift is approximately equal to the strain and is therefore more sensitive; however, it may be more difficult to measure a shift in wavelength reflection under these conditions. At some intermediate angle and for a given stress vector, the red shift due to stretching of the LC layers will be somewhat balanced by the blue shift due to Poisson-type contraction and an H-PDLC film may be obtained that is substantially insensitive to stress in one direction. A wavelength shift may then be observed, but only in a direction substantially orthogonal to that which is stress-insensitive (a blue-shift would occur due to LC layer contraction). The differing sensitivities of the H-PDLC film to stress in different directions permit the design of strain gauges in which the direction, as well as the magnitude, of strain may be determined.

Information regarding LC layer orientation is useful in determining not only the existence of strain but its directionality. As discussed herein, the directionality of the applied stress and the orientation of the LC layers can result in either a contraction, expansion or no change of the LC layer spacings. Moreover, some LC layer orientations are more sensitive than others to contraction or expansion of the d-spacing. This can provide valuable information as to the forces experienced by the workpiece.

It may be additionally possible to identify where on the workpiece surface the stress is experienced. For example, if the strain is experienced locally on the surface of the workpiece, only a subsection of the H-PDLC film attached to the workpiece surface would be subjected to the tensile or pressure forces which alter the reflection properties of the film. By observing the region of the H-PDLC film undergoing a wavelength shift, the strain site may be identified.

In those circumstance where the material characteristics of the H-PDLC film used in the strain gauge of the invention are well-understood, quantitative as well as qualitative information regarding strain may be obtained. For a polymer film in tension, the applied force (stress) may be proportional to strain and may be related to the strain experienced in the workpiece. For small deformations (i.e., less than 10% strain), the engineering stress may be defined as $stress_{eng}$= $E \cdot strain_{eng}$, where E is Young's modulus. For larger strains, a more accurate relationship may be defined as $stress_{true}$= $stress_{eng}(1+strain_{eng})$=$E \cdot strain_{true}$, where $strain_{true}$=ln(1+ $strain_{eng}$). Note that this permits determination of the stress (and strain) in the polymer film strip, which may not be the same as the stresses in the workpiece.

Uniaxial extension of a reflective H-PDLC film not only shifts the reflected wavelength, it also introduces a polarization dependence onto the observed reflected light. Polarization is manifested in differences in peak reflected wavelength and in the reflection efficiency for light polarized parallel (pi) and perpendicular (sigma) to the tensile axis. The polarization effect arises when the stresses on the film are sufficient to deform the LC droplets into prolate ellipsoids with the long axis aligned parallel to the tensile axis. The most energetically favorable droplet configuration for a prolate ellipsoid for homogeneous anchoring of the LC to the polymer is bipolar, with the symmetry axis of the droplet parallel to the long axis. For small strains, e.g., less than 3%, the polarization effect is slight. However, at higher strains, molecular orientation of the LC droplets occurs in addition to the d-spacing contraction discussed above. The strain regime which is most likely to be monitored by the strain gauge is in the range of 1–20%, so that the polarization effect is likely to be observed and to be a factor in interpreting the information obtainable from the reflective strain gauge For an LC with a positive birefringence, the refractive index of the LC droplet is greater parallel to the symmetry axis than perpendicular. In the unstrained state, the symmetry axes of the droplets are oriented randomly throughout the film and the modulation of the refractive index through the film is the same both parallel and perpendicular to the tensile axis. In the strained state, the alignment of the droplets means that the average refractive index and the index amplitude modulation are greater parallel to the tensile axis than perpendicular. The difference in profiles accounts for both the peak wavelength being lower for light polarized perpendicular and the lower reflection efficiencies for the sigma-polarized state. In the sigma-polarization state, the change in refractive index is small because the average refractive index of the droplets is closer to the ordinary refractive index, $n_o$, and therefore more closely matches the polymer ($n_o \approx n_p$). In the pi-state, the refractive index is weighted more towards the extraordinary refractive index, $n_e$, and the average refractive index is higher, thus increasing the optical path length between planes relative to the sigma state and increasing the peak reflected wavelength. In the pi-state, the amplitude of the refractive index modulation is also greater, resulting in greater efficiencies than the sigma-state.

Figure 7:
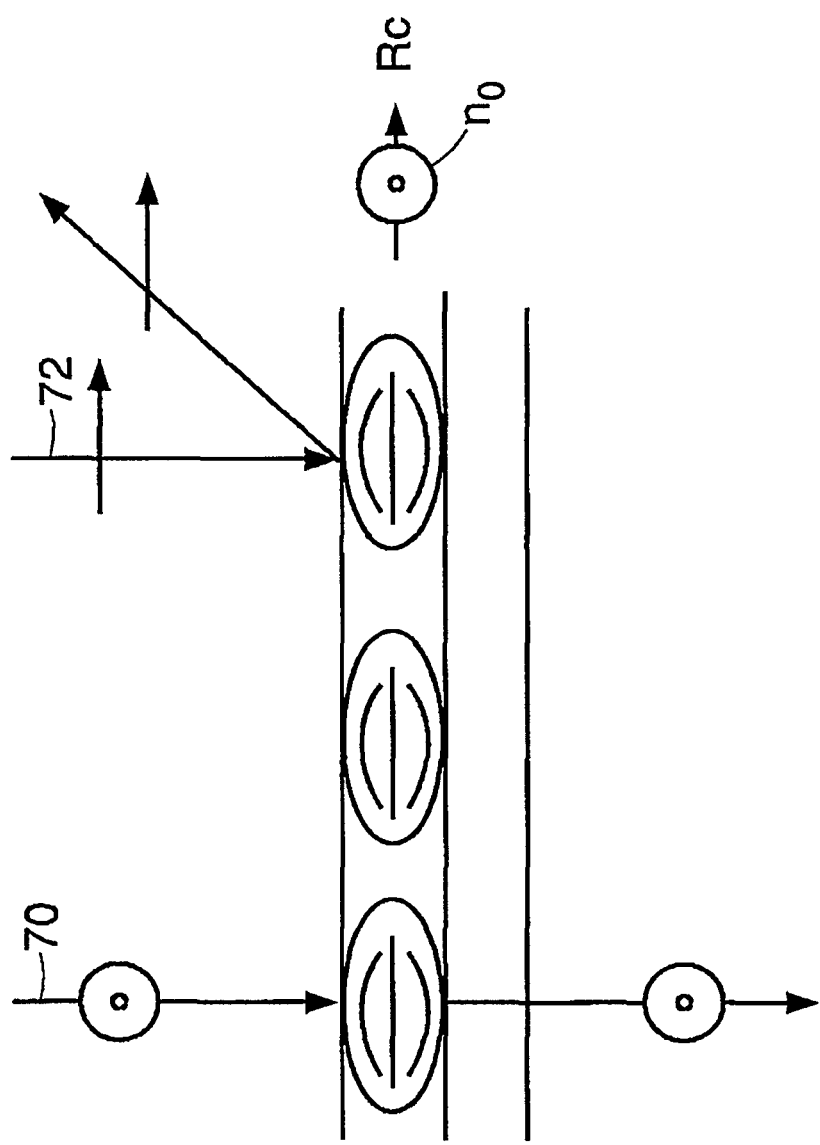
FIG. 7 is a schematic illustration of a polarization-sensitive H-PDLC film and its operation in polarized light.

A strain gauge of the invention may include a polarization dependent film as described above. In matrices where $n_o \approx n_p$, sigma-polarized light is transmitted through the film, while pi-polarized light is reflected. FIG. 7 illustrates this principle. Use of polarized light provides a strain gauge with an "on-off" indicator for surface strain, as compared to the "blue-green" indicator (or the like) for non-polarized reflector strain gauges. By way of example, a strain gauge may include a H-PDLC film having an average refractive index very close to that of the matrix polymer in the unstrained state and an average refractive index approaching $n_e$ in the strained state. Because of the similarity of the refractive indices, no reflection grating is perceived by incident light in the unstrained state and light is transmitted through the film. However, when stressed, the film deforms and the LC droplets molecularly orient to form polarized droplets having a higher refractive index than the surrounding matrix polymer. The reflection grating suddenly forms which reflects light of the selected wavelength. If the sample is illuminated with sigma-polarized light (arrow 70), no reflection is observed. If the light is illuminated with pi-polarized light (arrow 72), a reflection is observed. Monitoring for an on-off indication may be easier in some circumstances than monitoring for a colorshift.

Polarization-dependent light reflection provides additional advantages, such as increased reflection efficiency, and provides information on the directionality of the strain. Information regarding strain directionality may be obtained even if there is no discernible wavelength shift of the reflected light. For example, a film such as that shown in FIG. 6B may have LC planes at an angle θ that is stress-insensitive, that is, the d-spacing remains unchanged when stressed. Even so, the LC droplets may respond by aligning with the applied stress. Molecular alignment may be observed by scanning the film with a polarizer and noting the angles of increased intensity.

In addition, polarized films formed by stretching could be used to form polarization gratings. When unpolarized light illuminates the polarized films, sigma-polarized light will pass through the film without deflection, while pi-polarized light is reflected. Thus, only sigma-polarized light can pass through the film and can thereby serve as a polarizing light filter.

In some embodiments of the invention, the strain gauge includes aspected particles made up of the H-PDLC materials randomly dispersed in a supporting polymer which may be the same as that used in the H-PDLC aspected particles, or different. The matrix should, however, exhibit the desired response to applied strain, that is, it should be elastic, have high yield strength and a high strain tolerance to avoid failure under the anticipated use conditions. The aspected particles contain at least one dimension which is large with respect to the remaining dimension(s). Due to the aspected nature of the particles, the particles will rotate or otherwise orient themselves under an applied force so that the particles are aligned. The greater the aspect ratio, the greater the alignment force. The aspect ratio (dimension of the long to short dimensions) of the H-PDLC particles is preferably at least 2:1, more preferably at least 4:1, more preferably at least 10:1 and preferable at least 20:1.

Figure 8A:
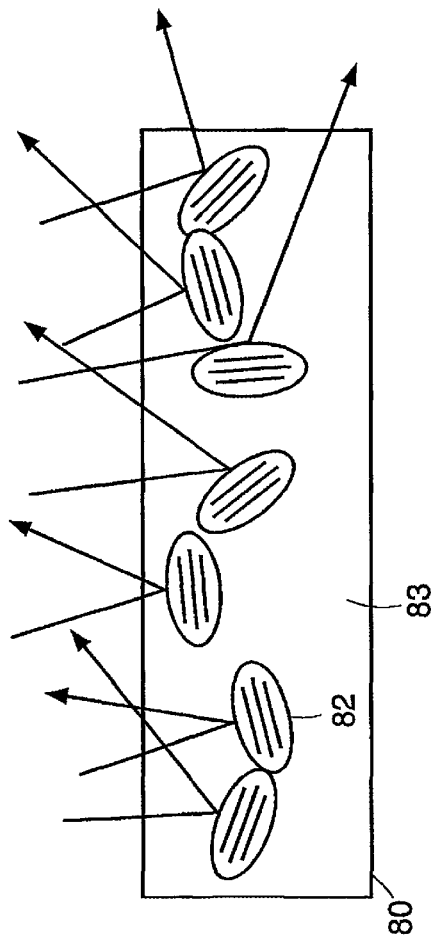
FIGS. 8A–B is a cross-sectional illustration of (A) a reflective strain gauge of the invention using aspected H-PDLC particles and (B) its operation under applied stress.
Figure 8B:
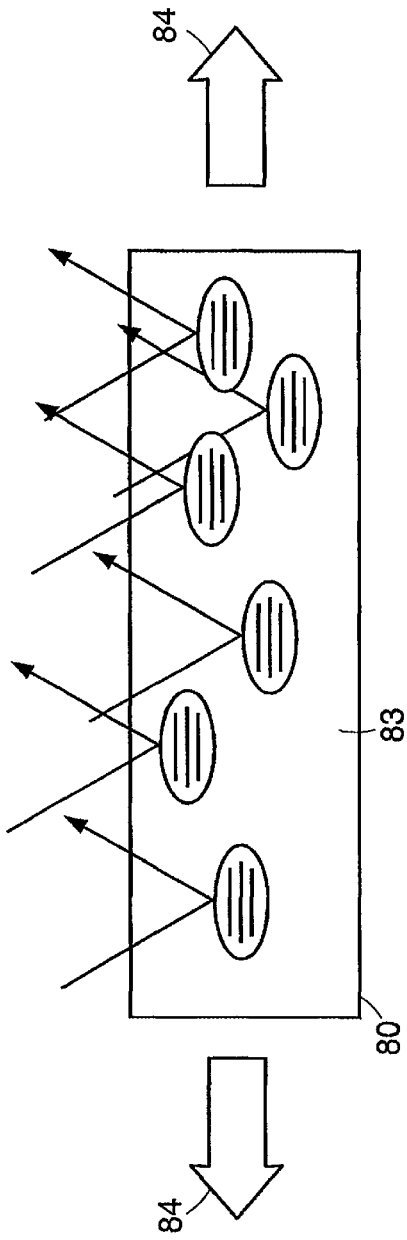

Referring now to FIG. 8A, a strain gauge 80 made up of aspected H-PDLC particles 82 in the unstrained state is depicted. The particles 82 are randomly distributed throughout a polymer matrix 83 with no preferred direction of orientation. As a result, the incident light is reflected back to the observer at various angles and the visual effect is indistinct. Under an applied force indicated by arrows 84 in FIG. 8B, the particles orient due to torque on the rod-like particles and the reflected image becomes more intense. The sudden increase in color sharpness and brightness is an indication that the surface of the workpiece has been stressed.

In another embodiment of the invention, a strain gauge is provided which contains two or more reflection gratings. By using more than one reflection grating, information regarding the tensor and/or location of strain is provided. The reflection gratings may be located in different H-PDLC films which are layered to form a multilayer strain gauge. Alternatively, the reflection gratings may be located within the same film, either by being written into the same portion of the film (overlapping), or by forming different gratings in different and non-overlapping regions of the same film.

In some embodiments, the multiple reflection gratings may have the same d-spacing, yet differ from one another by the orientation of the gratings with respect to the workpiece surface. As described above in FIG. 6B, the response of the grating to an applied force depends upon the relationship between the two, which is defined by the angle θ. In some instances, LC layers may be strain-insensitive in certain directions so directionality of the applied force may be determined. A single strain gauge may include a plurality of gratings at different angles, so that a strain response may be observed by at least one grating in any direction. This increases the useful operation range of the gauge as well as provides valuable information regarding the tensor of the applied stress. When the gratings reflect at different wavelengths (colors), then the observed reflected wavelength may be attributed to the appropriate grating and the directionality of the stress is known.

In other embodiments, the strain gauge may include films having reflection gratings of different d-spacings, which are capable of reflecting light of different wavelengths. The reflection gratings may be oriented to respond to stress applied in different directions. Depending upon which reflection grating exhibited a shift in reflected wavelength (or demonstrated an "on-off" shift or a polarization shift in the case of polarized films), the gauge indicates the direction of the applied stress. It may also be possible to arrange the layers such that one reflection grating shifts red under the applied strain, while a second layer shifts blue.

Figure 9:
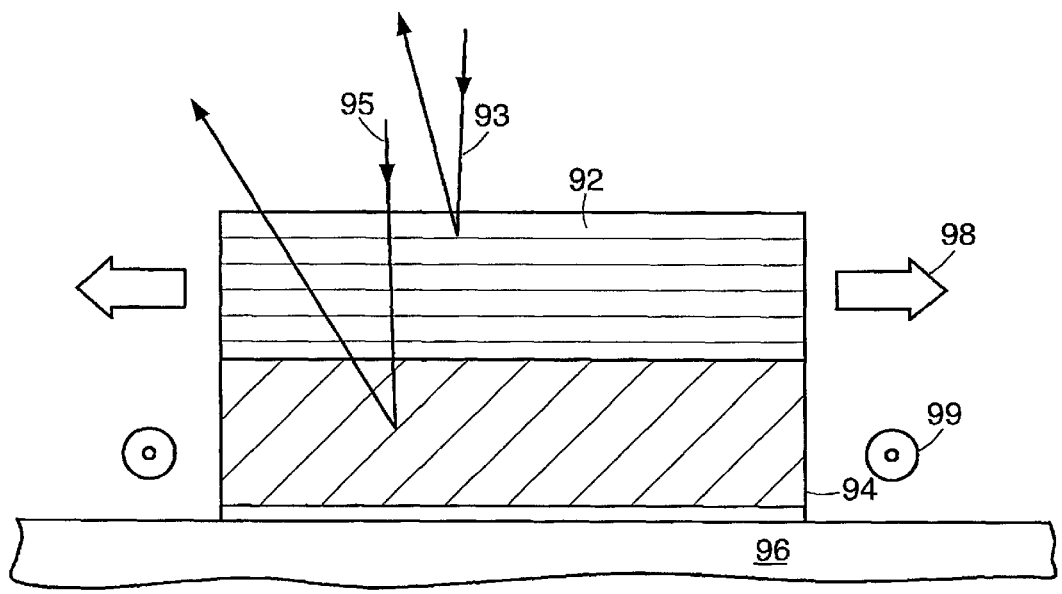
FIG. 9 is a cross-sectional illustration of another reflective strain gauge of the invention having two H-PDLC films of different LC layer orientation.

For example, a strain gauge 90 shown in FIG. 9 having a first H-PDLC layer 92 and a second H-PDLC layer 94. Each layer is made up of a reflection grating at a different orientation with respect to the workpiece surface 96. H-PDLC film 92, for example, may include a reflection grating having LC layers at a first angle $\theta_1$ (shown as layers sloping downward and into the plane of the paper) to the surface 96 and having a d-spacing to reflect red light. H-PDLC film 94, for example, may include a reflection grating having LC layers at a second angle $\theta_2$ to the surface 96 and having a d-spacing to reflect green light. Each layer is stress-insensitive to a different stress vector. Thus, each layer reflects light of a different wavelength and will respond with a shift in their reflection profile when subjected to strains in different directions. As stated above, the different reflection gratings need not be found in different layers. The reflection gratings may be positioned in the same film.

Film 92, for example, may be stretched along the length of the LC planes (denoted by large arrow 98). When the workpiece experiences a stress along this axis, the d-spacings contract and a blue shift of the red reflecting light 93 occurs. When observing light reflection at the angle defined for film 92 a strong shift in the reflected light is observed. Film 94, however, is stress-insensitive and light reflecting from it does not shift in wavelength. In contrast, when film 92 is subjected to a stress along the direction noted by arrow 99, no net change of the LC layer spacing occurs and no shift in the reflected light is observed. Film 94, however, is greatly effected by this stress vector and a change in the reflected light 95 is observed.

Methods of preparing H-PDLC films for use in the strain gauge of the invention are known. Multiple grating films may be prepared by exposing an H-PDLC precursor film to a plurality of interfering photopolymerizing interference patterns. Each interference pattern results in a reflection grating having characteristic LC plane orientation and d-spacing.

Figure 10:
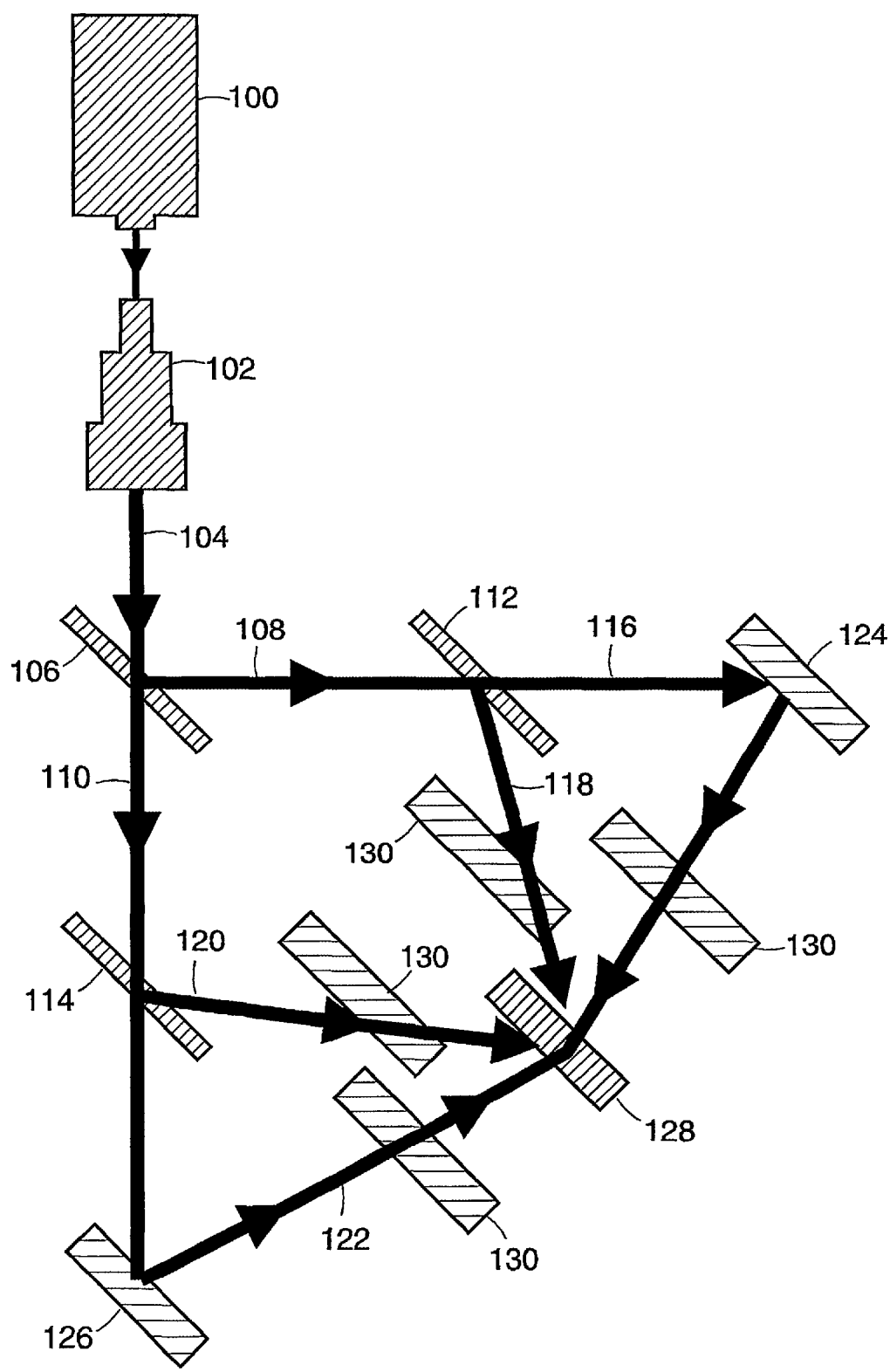
FIG. 10 is a schematic illustration of a method and apparatus for preparing an H-PDLC film.

The method and apparatus is described with reference to FIG. 10. A laser light source 100 generates light of a predetermined wavelength and optionally is then passed through a beam expander and spatial filter 102. The resultant laser beam 104 is split into the number of beam pairs required for the particular application. An intersecting beam pair is required for each reflection grating. For the purpose of simplicity, the method is described for a single reflection grating, however, the method may be adapted to provide multiple gratings, for example, through the use of beam splitters and mirrors to illuminate the surface with a plurality of beam pairs. A sample 128 is located at the crossover points of beam pairs. Beam pairs are aligned so that the beam pair 118, 120 is incident at angle, $\theta_1$, relative to the plane of the sample surface which produces a reflection grating of the desired wavelength. Additional laser beams pairs may be used to create as many additional holographic patterns as are desired for a particular application.

The sample is exposed to light for a short time, typically in the range of 20–60 seconds. The exposure time strongly depends on laser power (intensity), the choice of monomer, dye and liquid crystal, as well as the relative concentrations of the materials. The area of the sample illuminated by the holographic light formed by a first beam pair will produce a reflection grating different from that area of the sample illuminated by the holographic light formed by a second beam pair, so that different reflection gratings in a single film may be obtained, if desired. Further information regarding the preparation of multiple grating H-PDLC films may be found in U.S. Ser. No. 09/398,964, filed Sep. 16, 1999, and entitled "Holographically-formed Polymer Dispersed Liquid Crystals With Multiple Gratings," which is incorporated herein by reference.

Figure 11:
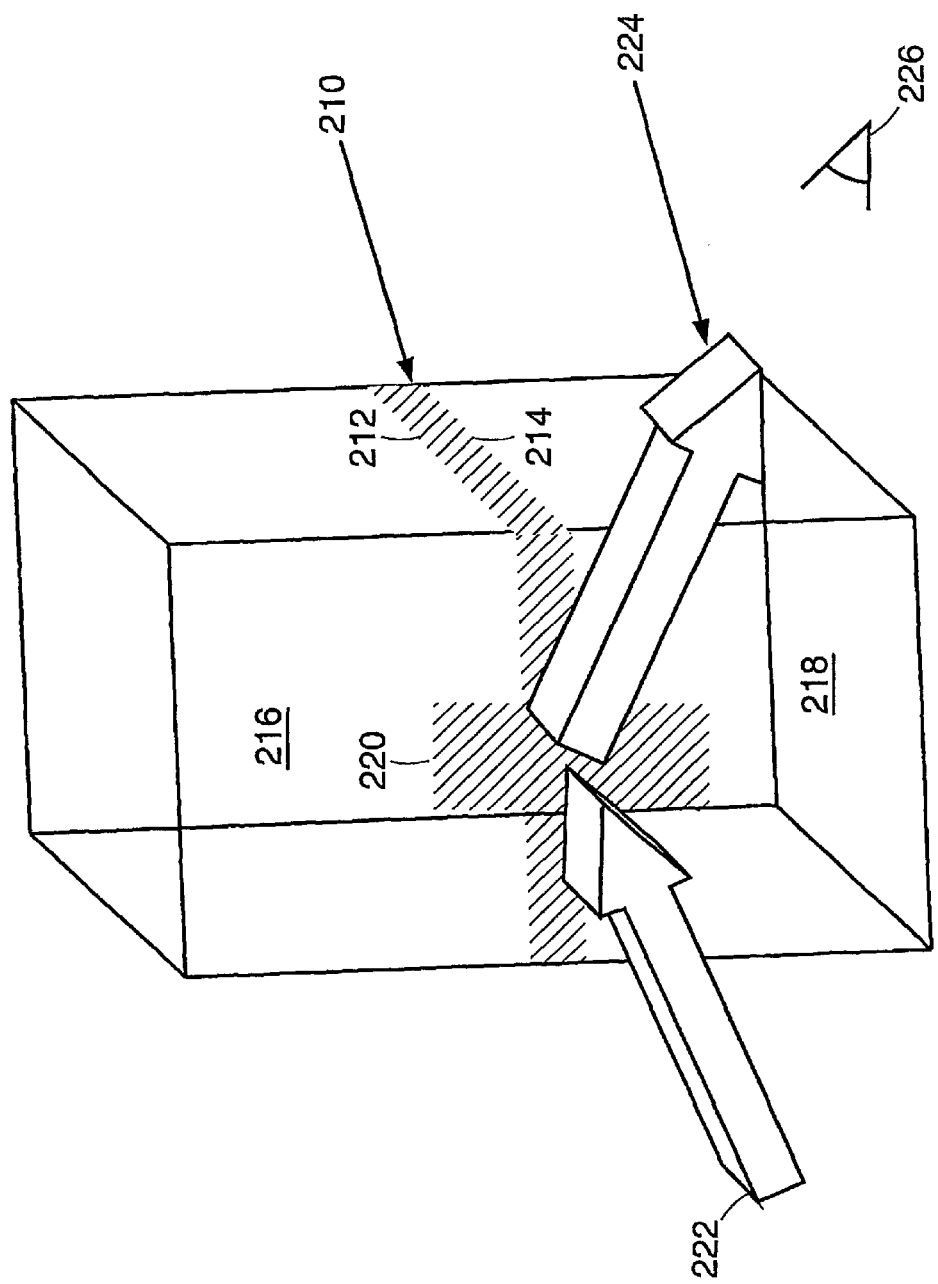
FIG. 11 is an illustration of an apparatus of the invention used to detect strain in a workpiece.

In one application of the invention, the strain gauge is used to detect failure in welds or other joints. An exemplary apparatus for the monitoring and detecting of strain is shown in FIG. 11. A weld 10 formed between two surfaces 12, 14 of workpieces 16, 18 may be monitored for failure. An H-PDLC reflective strain gauge 20 is positioned across the weld site. Incident light 22 (ambient light, polarized light, high intensity light, etc.) is reflected from the strain gauge surface as reflected light 24, which may be monitored at point 26 by conventional means, such as visual observation, spectrophotometric analysis and the like. If the weld fails, workpieces 16, 18 may shift relative to one another to thereby deform the H-PDLC film. A change in the nature of the reflected light is an indication of that deformation.

It is described herein above that bipolar oriented LC films may be formed under applied strain to provide a polarization sensitive H-PDLC film. In another aspect of the invention, oriented LC films are provided without application of an external force. Such films also are useful as polarizing filters and polarizing displays.

In one embodiment, a polarization sensitive H-PDLC film is provided in which the liquid crystal molecules within the LC droplets are aligned in a bipolar orientation. Such orientation takes places without deformation of the droplets into ellipsoids, as is the case when an external tensile force is applied. Instead, orientation of the LC molecules comes about due to preferential alignment of the liquid crystal about an additive to the phase that has the desired orientation. One such additive is a cis-configuration azo compound.

It is known that certain cis-trans molecules may be preferentially aligned in one of the two configurations on exposure to polarized light. Inclusion of such molecules in the prepolymer compositions for used in formation of H-PDLC films provides polarization sensitive films without external application of strain. When a cis-trans molecule is in its extended cis configuration, the anisotropic liquid crystal molecule preferentially aligns itself with the extended configuration. Several different dyes have been used in varying quantities, including but not limited to, azobenzene, methyl orange, congo red, methylene blue and crystal violet. By promoting photoalignment of the liquid crystal molecules, a preponderance of one orientation persists in the composition, giving rise to polarization dependence of the resultant H-PDLC film.

According to the invention, a cis-trans molecule, such as an azo dye, is added to the prepolymer mixture used to prepare H-PDLC films. A strongly polarized, low power UV source is used to uniformly align the cis-trans molecule in the cis-configuration without curing the polymer. No phase separation takes place under these conditions. The sample is then exposed to UV polymerizing light in a typical two-beam interference set-up to form the phase-separated H-PDLC (see FIG. 10). Alignment of the cis-trans molecule in the cis-configuration prior to polymerization and phase separation results in preferential molecular alignment of the LC droplets and gives rise to a polarization sensitive H-PDLC. This process facilitates the formation of a Bragg grating and azo-dye-aligned LC droplets within the sample, with minimal loss to beam writing efficiency.

The invention is described with reference to the following examples which are provided for the purpose of illustration only and which are not intended to be limiting of the invention.

EXAMPLE 1

This example describes the manufacture of an H-PDLC film and its evaluation to determine its suitability for use in a strain gauge.

The pre-polymer used in the H-PDLC formation was prepared from commercially available constituents. The monomer was a polyurethane oligomer of a functionality of three Nematic liquid crystals, such as those available under the tradename BL038 from EM Industries may be used. A photoinitiator sensitive to the laser wavelength used in photopolymerization, e.g., Rose Bengal, was used to sensitize the monomer to light. Relative proportions of materials were 50 wt % monomer, 35 wt % LC and 15 wt % initiator. The glass plates may be coated with release agent prior to film formation. Alternatively, the prepolymer solution may contain a release agent. The release agent facilitates separation of the polymerized film from the glass surface.

All materials are available from Sigma-Aldrich, Inc. The prepolymer was prepared under darkroom conditions, as exposure to ambient light may result in unwanted polymerization. Sample cells were prepared by drop-filling the prepolymer between two 2"×2" (5 cm×5 cm) ITO-coated glass substrates. Glass fiber spacers (EM Industries, 5 μm) were used to control the cell gap to 20 microns.

An argon laser ($\lambda$=514 nm) with an Etalon adapter was used. For an argon laser, Rose Bengal is a suitable photoinitiator. N-Phenylglycine was used as a co-initiator and 1-vinyl-2-pyrrolidone was also included to improve the optical properties of the device. Illumination angles were selected for the desired reflectance wavelength. The film was prepared using a standard two-beam set up. Exposure time was about 20–30 seconds.

Figure 13:
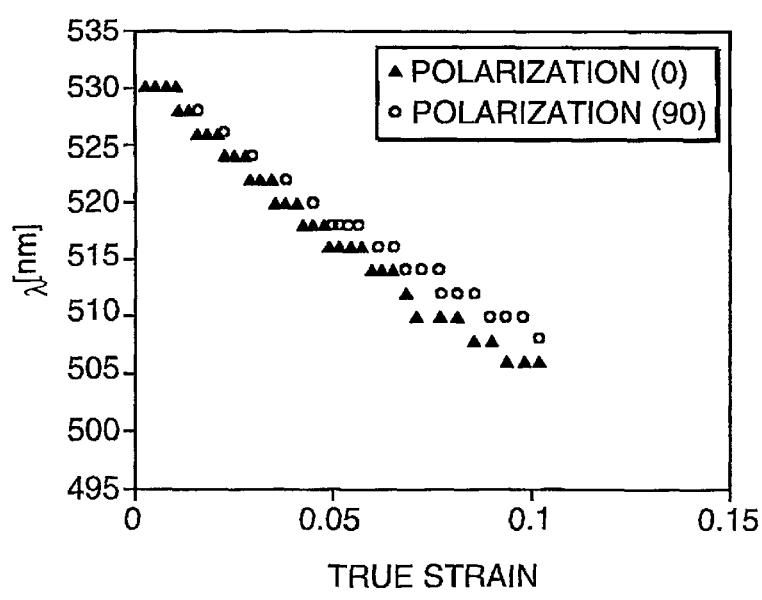
FIG. 13 is a plot of wavelength vs. true strain for an H-PDLC film.

The film was removed from the glass surface and placed in a miniature tensile testing machine (Rheometric Scientific Minimatt 2000). The optical properties of the H-PDLC were monitored as a function of strain using a Spectral Photometer (Photo Research Spectrascan). The reflected wavelength as a function of strain is shown in FIG. 13. The wavelength can be seen to decrease monotonically with increasing strain both for sigma- and pi-polarized light (relative to the pulling axis).

EXAMPLE 2

This example describes the preparation of an azo-polarized H-PDLC film.

Several dyes have been used in varying quantities. Exemplary quantities ranged from 0.25 wt %–1.5 wt %. These include Azobenzene, Methyl Orange, Congo Red, Methylene Blue and Crystal Violet. Raman-Nath transmission gratings were prepared, as the polarization sensitivity is more easily characterized than reflection gratings, however, the observed material properties should apply equally in both cases. Diffraction efficiency was measured using a Helium-Neon laser and a linear polarizer was used to control the polarization state. Diffraction efficiency was measured both parallel and perpendicular to the polarization direction of the curing beam.

A strongly polarized laser beam was used to cure the prepolymer mixture and longer than normal exposure times were used to encourage the liquid crystal droplets to photoalign. In many cases the presence of the dye strongly affected the formation of the H-PDLC. In the case of azobenzene, the effect was to slow the rate of cure of the polymer, presumably due to absorption of the laser light by azobenzene. To speed up photopolymerization, more photointiator (Rose Bengal, 1.43 wt % as compared to 0.54 wt %) and slightly less azobenzene (1.34 wt %) were used. Congo red (0.25–1.0 wt %) showed promise in that it gave the highest diffraction efficiency and a significant preferential alignment of the LC molecules, e.g., ca. 3:1 $n_{195}:n_{|i}$.

Figure 12:
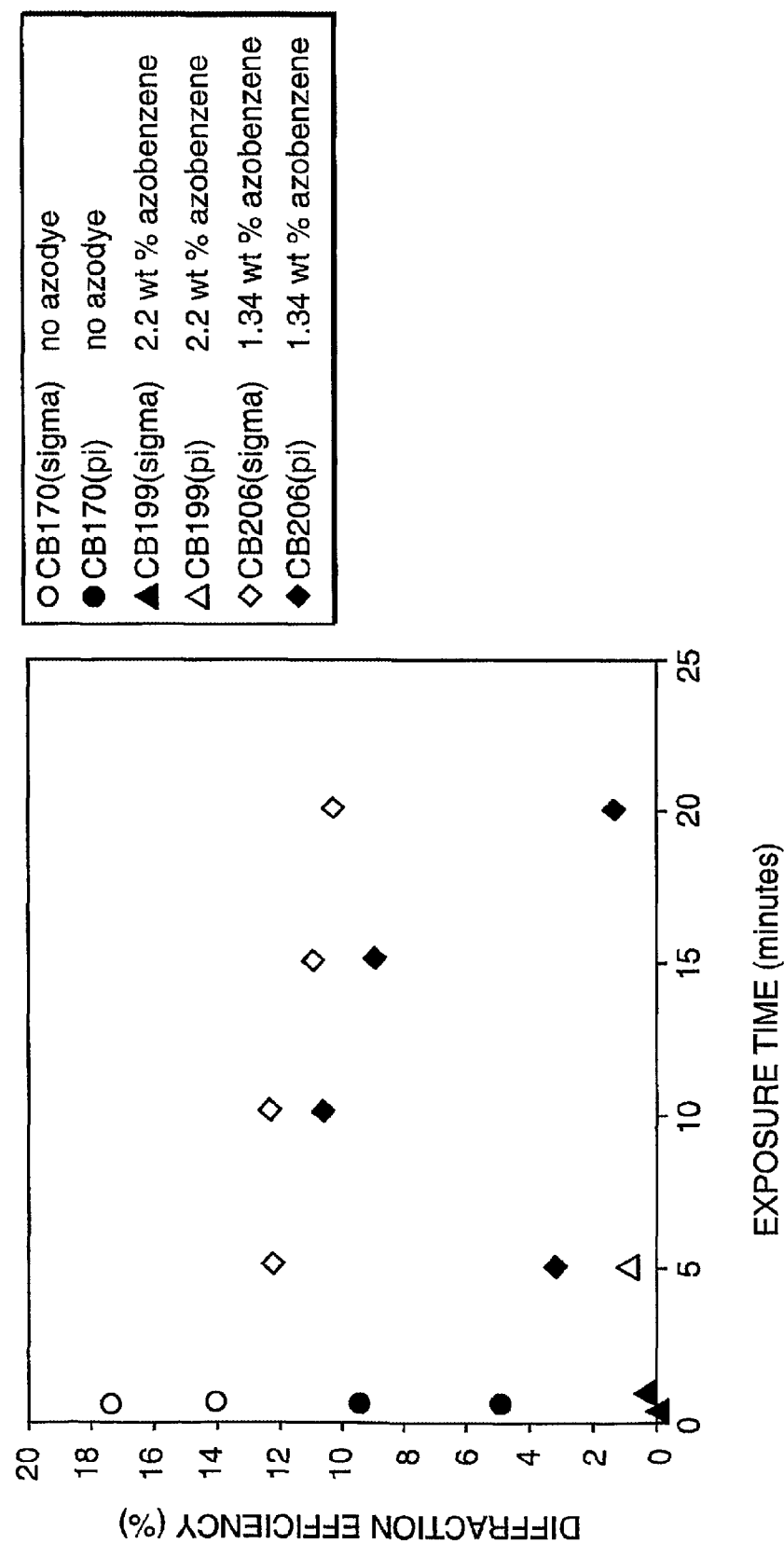
FIG. 12 is a plot of diffraction efficiency vs. exposure time for azobenzene-doped H-PDLC films.

Polarization dependence of the diffracted beam was observed in all samples, including the undoped materials. In all cases, diffraction efficiency was higher for the sigma-polarization state perpendicular to the writing laser polarization than the pi-state. This was expected for azo-induced alignment. The results for a sample using pre-polymer CB 170, alone, with 2.2 wt % azobenezene (0.54 wt % Rose Bengal), and with 1.34 wt % azobenzene CB199 (1.43 wt % Rose Bengal) are shown in FIG. 12.

Another approach was to pre-align the azo dye molecules prior to polymerization and phase separation. In this technique, the sample was exposed to a polarized, low UV power source sufficient to preferentially orient the azodye in the cis-configuration without polymer curing. The sample was then exposed in a typical two-beam interference set up to cure and phase separate the polymer. The process resulted in a H-PDLC with aligned azodye molecules without significant loss of beam writing efficiency.

What is claimed is:

1. A reflective strain gauge, comprising: a film comprising aspected particles, having an aspect ratio of at least 2:1, in an elastic polymer, said aspected particles comprising an holographically-formed polymer dispersed liquid crystal (H-PDLC) having layers of liquid crystal (LC) droplets in a matrix polymer, the H-PDLC having a reflection or transmission grating capable of reflecting or transmitting light of a selected wavelength; and means for securing the film to a surface of a workpiece for monitoring the strain at said surface.

2. The gauge of claim 1, wherein the film comprises multiple gratings.

3. The gauge of claim 2, wherein said gauge comprises a plurality of H-PDLC layers each said layer having at least one grating.

4. The gauge of claim 2, wherein different gratings are responsive to stress applied in different directions.

5. The gauge of claim 1, wherein said grating is oriented within said H-PDLC film so that surface strain is observed as a blue shift of the reflected or transmitted light.

6. The gauge of claim 1, wherein the intensity of the reflected or transmitted light is polarization dependent.

7. The gauge of claim 1, wherein the grating of the H-PDLC film is oriented such that the LC refractive index parallel to an axis ($\eta_e$) is greater than the LC refractive index perpendicular to an axis ($\eta_o$).

8. The gauge of claim 7, wherein $\eta_o$ substantially matches the refractive index of the in matrix polymer.

9. The gauge of claim 7, wherein the LC droplets in a strained state form ellipsoids with long axes aligned parallel to an axis of an applied force.

10. The gauge of claim 7, wherein LC molecules of the LC droplets are aligned in a bipolar orientation.

11. The gauge of claim 1, wherein the matrix polymer is selected to have sufficient elasticity to sustain an applied strain without failure, said strain proportionate to a strain of a workpiece.

12. The gauge of claim 1, wherein the elastic polymer is selected to have sufficient elasticity to sustain all applied strain without failure, said strain proportionate to a strain of a workpiece.

13. The gauge of claim 1, wherein the layers are at an angle to the film surface.

14. The gauge of claim 1, wherein said aspected particles have an aspect ratio in the range of at least 4:1.

15. The gauge of claim 1, wherein said aspected particles have an aspect ratio in the range of at least 10:1.

16. The gauge of claim 1, wherein said grating is oriented so that compressive surface strain is observed as a blue shift of the reflected or transmitted light.

17. The gauge of claim 1, wherein the shift is a shift in wavelength of light.

* * * * *